United States Patent [19]

Mayer et al.

[11] Patent Number: 4,580,714
[45] Date of Patent: Apr. 8, 1986

[54] HARD SOLDER ALLOY FOR BONDING OXIDE CERAMICS TO ONE ANOTHER OR TO METALS

[75] Inventors: Rolf Mayer, Winnenden-Schelmenholz; Karl Ochs, Grossbottwar, both of Fed. Rep. of Germany

[73] Assignee: Robert Bosch GmbH, Stuttgart, Fed. Rep. of Germany

[21] Appl. No.: 600,373

[22] Filed: Apr. 16, 1984

[30] Foreign Application Priority Data

May 7, 1983 [DE] Fed. Rep. of Germany ....... 3316807

[51] Int. Cl.⁴ ............................................ B26B 35/30
[52] U.S. Cl. .................... 228/121; 228/122; 228/198; 228/263.12; 228/263.16
[58] Field of Search ........................ 164/263.21, 263.12, 164/263.11, 122, 121, 219, 221; 420/492, 488, 489; 228/198, 263.16

[56] References Cited

U.S. PATENT DOCUMENTS 3,517,432 6/1970 Sandstrom ........................... 228/121
4,426,033 1/1984 Mizuhara ............................. 420/492
4,448,853 5/1984 Fischer et al. ................. 228/263.12

FOREIGN PATENT DOCUMENTS 2457198 6/1976 Fed. Rep. of Germany ...... 420/492

OTHER PUBLICATIONS

Nesse, "Untersuchungen zum Aktivlöten von Keramik und Graphit", Metallwissenschaft und Technik, vol. 27, Mar. 1973, No. 3, pp. 259–265.

Primary Examiner—Kenneth J. Ramsey
Attorney, Agent, or Firm—Frishauf, Holtz, Goodman & Woodward

[57] ABSTRACT

The invention provides a hard solder alloy for bonding oxide ceramics to each other or to metal, particularly to alloy steels. The hard solder alloy comprises 65–80% copper, 15–35% titanium, 0.5–5% aluminum and 0.5–5% vanadium. The invention also provides a method of bonding the surfaces utilizing said hard solder alloy as the soldering alloy. The invention further provides a preferred method in which the said hard solder alloy is provided in the form of two components, namely copper and the alloy $TiAl_6V_4$.

13 Claims, 2 Drawing Figures

HARD SOLDER ALLOY FOR BONDING OXIDE CERAMICS TO ONE ANOTHER OR TO METALS

The present invention relates to a hard solder alloy for bonding oxide ceramics to one another or to metals, in particular alloyed steels.

BACKGROUND OF THE INVENTION

Ceramic materials have manifold uses in technology. However, their applicability is often dependent upon whether suitable bonding methods are known. The bonding of ceramic parts to one another and to metals presents considerable difficulties because of the differences between the materials.

Of the methods for producing positive material bonding in ceramics, it is primarily the conventional hard and soft soldering of metallized ceramic parts that is used in practice. This method requires many method steps, so that it becomes complicated and expensive to produce bonding of this kind.

In order to make it possible to dispense with the pre-metallizing of the ceramic parts, active soldering methods are used. These methods do not usually differ from the conventional soldering process performed in a protective gas or in a vacuum. As solder, however, hard solder having alloy components of very reactive metals, such as titanium, zirconium and others, is used. In oxide ceramics, the molten active solder reacts, working from the contact surface out, by reducing the surface layer of the basic material, forming suboxides. In this process, free chemical valences are produced at the surface of the ceramic, which are capable of bonding with the solder and thereby effecting good wetting of the molten solder and firm adhesion of the solidified solder on the ceramic. Furthermore, active metal oxides are deposited in the surface layer of the ceramic.

In the journal "METALL" (*Metal*), volume 27, March 1973, No. 3, pp. 259-265, the soldering behavior of various hard solder alloys are examined with respect to the basic material of aluminum oxide, in terms of their flowing behavior, wetting and adhesion behavior, infiltration and tensile strength. The greatest tensile strength values were attained with the 49Cu/49Ti/2B solder, which must be used under a high vacuum. The tensile strength amounted to 25% of the strength of the basic material. This solder also has very good flow properties on aluminum oxide. Equally good strength was ascertained for the 70Ag/27Cu/3Ti and 96Ag/-4CuO solders. However, the flow behavior and wetting behavior of these solders is not always satisfactory. The hard solder alloy 49Cu/49Ti/2Be is a brittle solder alloy. It is used exclusively in powdered form under a vacuum. By contrast, the alloy 70Ag/27Cu/3Ti is a ductile solder alloy, which can be rolled out into foils of solder having a thickness of 0.1 mm. The solder 96Ag/-4CuO is also a ductile solder alloy, which is suited only for soldering in an oxidizing atmosphere. The flow behavior on aluminum oxide is relatively good. The strength values that are attained, however, are considerably below those for the 49Cu/49Ti/2Be solder.

SUMMARY OF THE INVENTION

The present invention provides a hard solder alloy for bonding oxide ceramics to one another or to metals particularly to alloyed steels. The hard solder alloy comprises about 65 to about 80% copper, about 15 to 35% titanium, about 0.5 to 5.0% aluminum and about 0.5 to 5.0% vanadium. The hard solder alloy preferably contains from 70 to 80% copper, 17 ... 29% titanium, 1 ... 2% aluminum and 1 ... 2% vanadium. The particularly preferred alloy comprises 72.2% copper, 25% titanium, 1.7% aluminum and 1.1% vanadium. The invention also provides the method utilizing said hard solder alloy to bond an oxide ceramic surface to another oxide ceramic surface or to a metal surface (particularly an alloy steel containing iron and nickel and/or cobalt by positioning the hard solder alloy between the surfaces which are being bonded and heating until the alloy becomes molten and bridges the space separating the two surfaces which are being bonded and then cooled to form a solid joint. The present invention also provides a preferred method in which the components of the hard solder alloy are provided in two separate units namely copper and an alloy of $Ti/Al_6/V_4$ which are preferably in the form of foils.

The hard solder alloy according to the invention is superior to the solders described above. In particular, it has very good flow and wetting properties, a good ability to fill cracks and great strength. It is excellently well suited for hard soldering of aluminum oxide ceramic parts either to one another or to metals having identical or similar heat expansion coefficients, such as Fe/Ni/Co alloys. Tests have showed that the tensile strength of a soldered bond made with the solder alloy according to the invention is greater than that of aluminum ceramic. The alloy can accordingly be used wherever a durable, gas-tight, temperature- and vibration-resistant bonding of a ceramic substrate to metals, preferably those with identical heat expansion coefficients, is an important criterion. This is the case, for instance, with sensors for ascertaining the exhaust gas values in internal combustion engines, where a ceramic substrate is disposed in a metal housing and firmly bonded thereto.

The hard solder alloy according to the invention also has good wetting behavior and good strength in the soldering of nickel chromium steel and unalloyed steel in a vacuum furnace.

The solder material may be applied in the form of a molten, ready-to-use four-component alloy. However, it is considerably more advantageous to use the method according to the invention, in which individual components of Cu and $Ti/Al_6/V_4$ (spring material) available on the market are used, in particular in the form of foils to be disposed in layers between the structural components that are to be bonded to one another.

The superficial extent of the foils at a given time is determined by the predetermined contact surfaces of the materials to be bonded together, and the thickness of the foils at a particular time is determined by the proportion of the components in percent by weight. Their disposition in a sequence of layers depends on the material and the surface layer of the structural parts to be bonded as well as on the thickness of the desired hard solder layer. Preliminary metallizing of the ceramic body is no longer required, which offers a significant advantage in terms of process technology.

DETAILED DESCRIPTION

Figure 1:
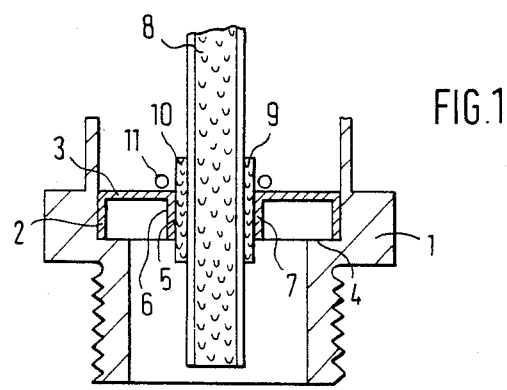
FIG. 1 shows a ceramic-metal combination with a ready-to-use molten four-component hard solder.

In FIG. 1, a housing 1 is shown, for instance the housing for an exhaust gas sensor, which has the form of a hollow cylinder and is made of a metal material, such as iron or steel. A disk 3 provided with a cylindrical rim surface 2 is pressed into the housing 1, its position in the longitudinal direction of the housing being determined by a collar 4 embodied on the inner wall of the housing. The disk 3, which is made of an Fe/Ni/Co alloy, has a slit 5, which is defined by two parallel tabs 6, 7 and serves to receive a plate 8 made of a ceramic substrate, preferably aluminum oxide ceramic, which in the vicinity of the slit 5 has thickened parts 9, 10.

A solder wire 11 is placed around the plate 8, having a composition of from 65 to 80% copper, 15 to 35% titanium, 0.5 to 5.0% aluminum and 0.5 to 5.0% vanadium and resting on the flat, upwardly oriented surface of the disk 3. Upon being heated to approximately 1120° C., the hard solder alloy melts and flows into the crack 5 that exists between the thickened parts 9, 10 and the tabs 6, 7, filling it completely, and after the soldering process is finished the hard solder alloy hardens there.

The excellent wetting and flow properties as well as the good ability to fill cracks and the great strength of the hard solder alloy described herein assures a durable bonding of the parts 3 and 8, which is capable of withstanding severe mechanical and thermal stresses. The soldering temperature, as already noted, amounts to approximately 1120° C. A suitable soldering atmosphere is a high vacuum or protective gas.

Figure 2:
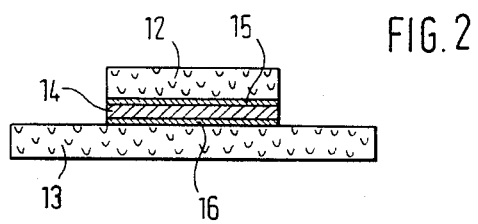
FIG. 2 shows a combination of materials using hard solder made from separate individual components.

FIG. 2 shows two chips 12, 13, of which either both may be of ceramic or one may be of a ceramic material and the other of a metal material, preferably an Fe/Ni/Co alloy. Between the two chips, foils of Cu and Ti/Al$_6$/V$_4$ are placed, as individual components of the hard solder alloy described herein, in sandwiched fashion one above the other. In the exemplary embodiment the disposition is such that a Ti/Al$_6$/V$_4$ foil 14, which has a thickness of 0.08 mm, is embedded between two copper foils 15, 16, each of which has a thickness of 0.05 mm. The copper foils, in turn, are in contact with the two chips 12, 13 that are to be bonded together.

During the soldering process in the furnace, the two components are made molten and melt together to form a homogeneous, crack-filling alloy, which has the positive properties discussed above.

A preferred solder wire for use in the method of the invention disclosed hereinbefore is an alloy of 72.2% copper, 25%, titanium, 1.7% aluminum and 1.1% vanadium.

Various changes and modifications may be made, and any features described herein may be used with any of the others, within the scope of the inventive concept.

We claim:

1. A hard solder alloy for bonding oxide ceramics to one another or to metals consisting essentially of from about 65 to 80% copper, about 15 to about 35% titanium, about 0.5% to 5% aluminum and about 0.5% to 5% vanadium.

2. The hard solder alloy of claim 1 consisting essentially of 72.2% copper, 25% titanium, 1.7% aluminum and 1.1% vanadium.

3. The method of joining an oxide ceramic article to another oxide ceramic article or to a metal article comprising positioning at least two of said articles to be bonded together closely adjacent each other with an intervening space and then bridging said space with a hard solder alloy consisting essentially of from about 65 to 80% copper, about 15 to 35% titanium, about 0.5% to 5% aluminum and about 0.5% to 5% vanadium in molten form and then cooling to solidify said alloy whereby said at least two articles which are being bonded together are firmly bonded.

4. The method of claim 3 wherein said hard solder alloy consisting essentially of 72.2% copper, 25% titanium, 1.7% aluminum and 1.1% vanadium.

5. The method of claim 3 wherein said oxide ceramic is aluminum oxide.

6. The method of claim 5 wherein at least one of said articles is an alloy steel containing at least one of nickel and cobalt.

7. The method of claim 6 wherein said hard solder alloy consisting essentially of 72.2% copper, 25% titanium, 1.7% aluminum and 1.1% vanadium.

8. The method of bonding an oxide ceramic article to another oxide ceramic article or to a metal article comprising positioning the articles to be bonded together closely adjacent each other with an intervening space and then positioning copper in the form of wire or foil and TiAl$_6$V$_4$ in the form of wire or foil in said intervening space, the amount of said copper and said TiAl$_6$V$_4$ being such as to provide a total of from about 65 to about 80% copper, about 15 to about 35% titanium, about 0.5 to 5% aluminum and about 0.5 to about 5% vanadium, heating said articles which are being bonded including said copper and said TiAl$_6$V$_4$ to a temperature sufficient to cause said copper and said TiAl$_6$V$_4$ to form a hard solder alloy consisting essentially of from about 65 to 80% copper, about 15 to about 35% titanium, about 0.5% to 5% aluminum and about 0.5% to 5% vanadium and then cooling to solidify said hard solder alloy whereby said at least two articles which are being bonded together are firmly bonded by said hard solder alloy.

9. The method of claim 8 wherein said oxide ceramic article is an aluminum oxide article.

10. The method of claim 9 wherein at least one of said articles is an alloy steel containing at least one of nickel and cobalt.

11. The method of claim 10 wherein said hard solder alloy consisting essentially of 72.2% copper, 25% titanium, 1.7% aluminum and 1.1% vanadium.

12. The method of claim 9 wherein said hard solder alloy consisting essentially of from 70 to 80% copper, 17 to 29% titanium, 1 to 2% aluminum and 1 to 2% vanadium.

13. The hard solder alloy of claim 1 consisting essentially of from 70 to 80% copper, 17 to 29% titanium, 1 to 2% aluminum and 1 to 2% vanadium.

* * * * *